(12) United States Patent
Kawakami et al.

(10) Patent No.: US 11,194,380 B2
(45) Date of Patent: Dec. 7, 2021

(54) SEMICONDUCTOR DEVICE AND CONTROL SYSTEM USING THE SAME

(71) Applicant: RENESAS ELECTRONICS CORPORATION, Tokyo (JP)

(72) Inventors: Naotaka Kawakami, Tokyo (JP); Toshiro Fujisaki, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 239 days.

(21) Appl. No.: 16/446,166

(22) Filed: Jun. 19, 2019

(65) Prior Publication Data

US 2020/0004315 A1  Jan. 2, 2020

(30) Foreign Application Priority Data

Jun. 28, 2018 (JP) .............................. JP2018-123524

(51) Int. Cl.
  *G06F 1/32*  (2019.01)
  *G06F 1/3234*  (2019.01)
  *G06F 1/20*  (2006.01)

(52) U.S. Cl.
  CPC ............ *G06F 1/3243* (2013.01); *G06F 1/206* (2013.01)

(58) Field of Classification Search
  CPC ..... G06F 1/32; G06F 1/28; G06F 1/12; G06F 9/44
  See application file for complete search history.

(56) References Cited

U.S. PATENT DOCUMENTS

| | | | |
|---|---|---|---|
| 5,929,681 A * | 7/1999 | Suzuki ..................... | G11C 7/20 327/284 |
| 9,329,609 B1 * | 5/2016 | Goyal ....................... | G05F 1/46 |
| 10,274,990 B1 * | 4/2019 | Chang ...................... | G06F 1/08 |
| 2004/0196504 A1 * | 10/2004 | Kono ..................... | H04N 1/193 358/300 |
| 2012/0249048 A1 * | 10/2012 | Nishibayashi ........... | H02J 3/32 320/101 |

FOREIGN PATENT DOCUMENTS

JP    2003-271250 A    9/2003

* cited by examiner

*Primary Examiner* — Keshab R Pandey
(74) *Attorney, Agent, or Firm* — McDermott Will & Emery LLP

(57) ABSTRACT

It is an object of the present invention to provide a technique capable of reducing power consumption of a semiconductor device even when the semiconductor device operates at high speed. The semiconductor device includes a module for outputting a signal, a delay element, a first output circuit having an input and an output, a first external terminal connected to the output of the first output circuit and to be connected to a signal wiring, and a second external terminal. The input of the first output circuit receives the signal delayed by the delay element. The second external terminal receives the signal without passing through the delay element. The signal of the second external terminal is used to change the potential level of the signal wiring to be connected to the first external terminal before the first output circuit changes the potential of the first external terminal based on the delayed signal.

8 Claims, 14 Drawing Sheets

20

SEMICONDUCTOR DEVICE AND CONTROL SYSTEM USING THE SAME

CROSS-REFERENCE TO RELATED APPLICATIONS

The disclosure of Japanese Patent Application No. 2018-123524 filed on Jun. 28, 2018 including the specification, drawings and abstract is incorporated herein by reference in its entirety.

BACKGROUND

The present disclosure relates to a semiconductor device and a control system using the same.

Along with the continuous improvement of the performance of semiconductor devices such as microcontroller units (MCUs), heat generated by the MCUs has attracted attention in control devices using MCUs. In particular, in an in-vehicle MCU for controlling an engine of an automobile or the like, an MCU having an electric power exceeding 2 W has also been developed. In order to reduce such an amount of heat generation, a technique for reducing the power consumption of the MCU is required.

In Japanese unexamined Patent Application publication No. 2003-271250, there is a disclosed technique of simply realizing a circuit capable of reducing wasteful power consumption by lowering a power supply voltage in a microcomputer IC except when the microcomputer IC is temporarily operated at high speed.

SUMMARY

The present inventors have investigated a technique capable of reducing power consumption and heat generation when the MCU operates at high speed. As a result, countermeasures such as suppression of the processing load of the application executed by the MCU and thermal countermeasures for the mounting board on which the MCU is mounted were considered. However, the suppression of the processing load has a problem that the processing capacity of the MCU cannot be utilized. Further, there is a problem that an extra cost is required for the thermal countermeasure of the mounting substrate.

It is an object of the present disclosure to provide a technique capable of reducing power consumption of a semiconductor device even when operating at high speed.

Other objects and novel features will become apparent from the description of this specification and the accompanying drawings.

DETAILED DESCRIPTION

Figure 1:
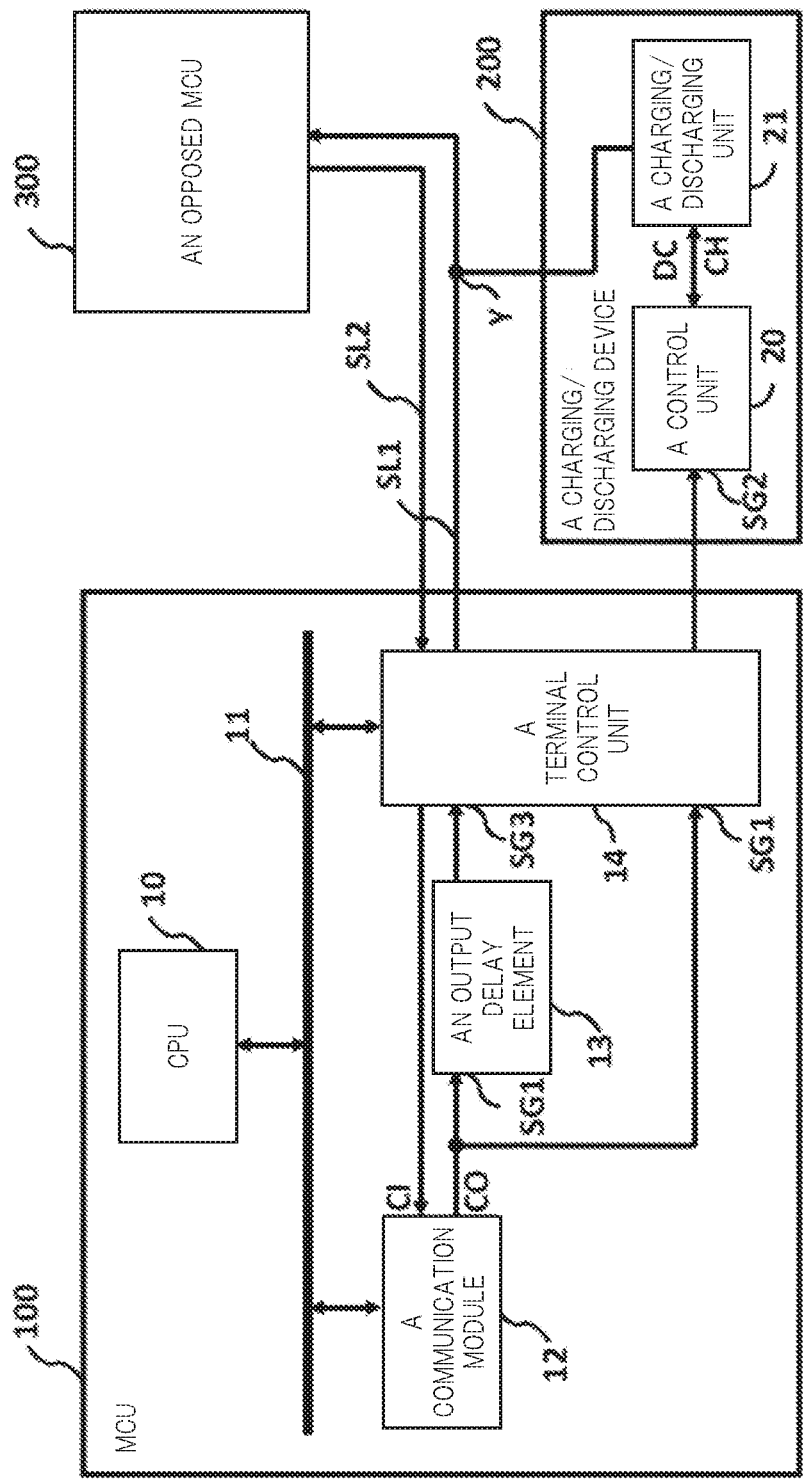
FIG. 1 is a block diagram showing a control system according to a first embodiment.

Embodiments, examples, comparative examples, and application examples will be described below with reference to the drawings. However, in the following description, the same components are denoted by the same reference numerals, and a repetitive description thereof may be omitted. It should be noted that the drawings may be represented schematically in comparison with actual embodiments for the sake of clarity of explanation but are merely an example and do not limit the interpretation of the present invention.

First Embodiment

FIG. 1 is a block diagram showing a control system according to a first embodiment.

The control system 1 is, for example, an electronic control unit (ECU) used for controlling an automobile. The control system 1 includes a microcontroller unit (MCU) 100, a charging/discharging device 200, and an opposed microcontroller unit (opposed MCU) 300. The MCU 100 is also referred to as a first semiconductor device, and the opposed MCU 300 is also referred to as a second semiconductor device. The charging/discharging device 200 is connected to the output-signal line SL 1 connected from the MCU 100 to the opposed MCU 300. The charging/discharging device 200 controls the voltage level of a connection point (intersection point) Y between the charging/discharging device 200 and the output signal line SL 1. As a result, the high-level output current IOH (hereinafter, also simply referred to as IOH) and the low-level output current IOL (hereinafter, simply referred to as IOL) flowing from the MCU 100 to the output-signal line SL 1 are reduced. The IOH and IOL will be described in detail in the description of FIG. 3 and FIG. 4.

MCU 100 is a semiconductor device (first semiconductor device) formed on one semiconductor chip, and includes a central processing unit (CPU) 10, bus 11, communication module 12, output delay element 13, and terminal control unit 14. The CPU 10 is connected to the communication module 12 and the terminal control unit 14 via the bus 11, and performs various settings of the communication module 12 and the terminal control unit 14.

The communication module 12 is a module for performing communication between the MCU 100 and the opposed MCU 300. The output CO of the communication module 12 is divided into a signal SG1 connected to the output delay element 13 and a signal SG2 connected to the charging/discharging device 200 via the terminal control unit 14. The signal SG2 is based on the signal SG1 connected to the terminal control unit 14. The input CI to the communication module 12 are connected from the opposed MCU 300 to the communication module 12 via the signal lines SL 2 and the terminal control unit 14.

If the communication module 12 outputs a communication signal before the control of charging or discharging is completed by the charging/discharging device 200, the output delay element 13 cannot reduce IOH or IOL, and therefore has a function of delaying the signal by the delay element and adjusting the timing of the output signal of the communication module 12. The signal SG3 generated by delaying the signal SG1 by the output delay device 13 is connected to the opposed MCU 300 via the terminal control unit 14 and the signal line SL 1. As the delay element, for example, a flip-flop (FF), a delay buffer, or the like can be employed.

The terminal control unit 14 has a function of performing input/output control of an input terminal and an output terminal of the MCU 100. The terminal control unit 14 also includes an input buffer IB connected to the input terminal and an output buffer OB connected to the output terminal. When the MCU 100 is connected to a device other than the MCU 100 (corresponding MCU 300, charging/discharging device 200), it passes through the terminal control unit 14. IOH and IOL are currents flowing in the output buffer OB, and IOH and IOL are one of the factors causing the MCU 100 to generate heat.

The charging/discharging device 200 includes a control unit 20 and a charging/discharging unit 21.

The control unit 20 receives signals SG2 from the MCU 100. When the signal level of the signal SG2 is high level (hereinafter, also referred to as H output), the control unit 20 outputs the discharge request DC to the charge/discharge unit 21 to control the charge/discharge unit 21 to perform the discharge processing, and when the signal level of the signal SG2 is low level (hereinafter, also referred to as L output), the control unit 20 outputs the charge request CH to the charge/discharge unit 21 to control the charge/discharge unit 21 to perform the charge processing. The control unit 20 can use, for example, a semiconductor device such as a microcomputer or a desired logic circuit.

The charge/discharge unit 21 performs discharge processing when receiving a discharge request DC from the control unit 20, and performs charge processing when receiving a charge request CH from the control unit 20.

The opposed MCU 300 is a semiconductor device (second semiconductor device) formed on one semiconductor chip, and communicates with the MCU 100. The input signal and the output signal of the opposed MCU 300 are connected to the MCU 100 via the signal line SL 1 and the signal line SL 2.

Figure 2:
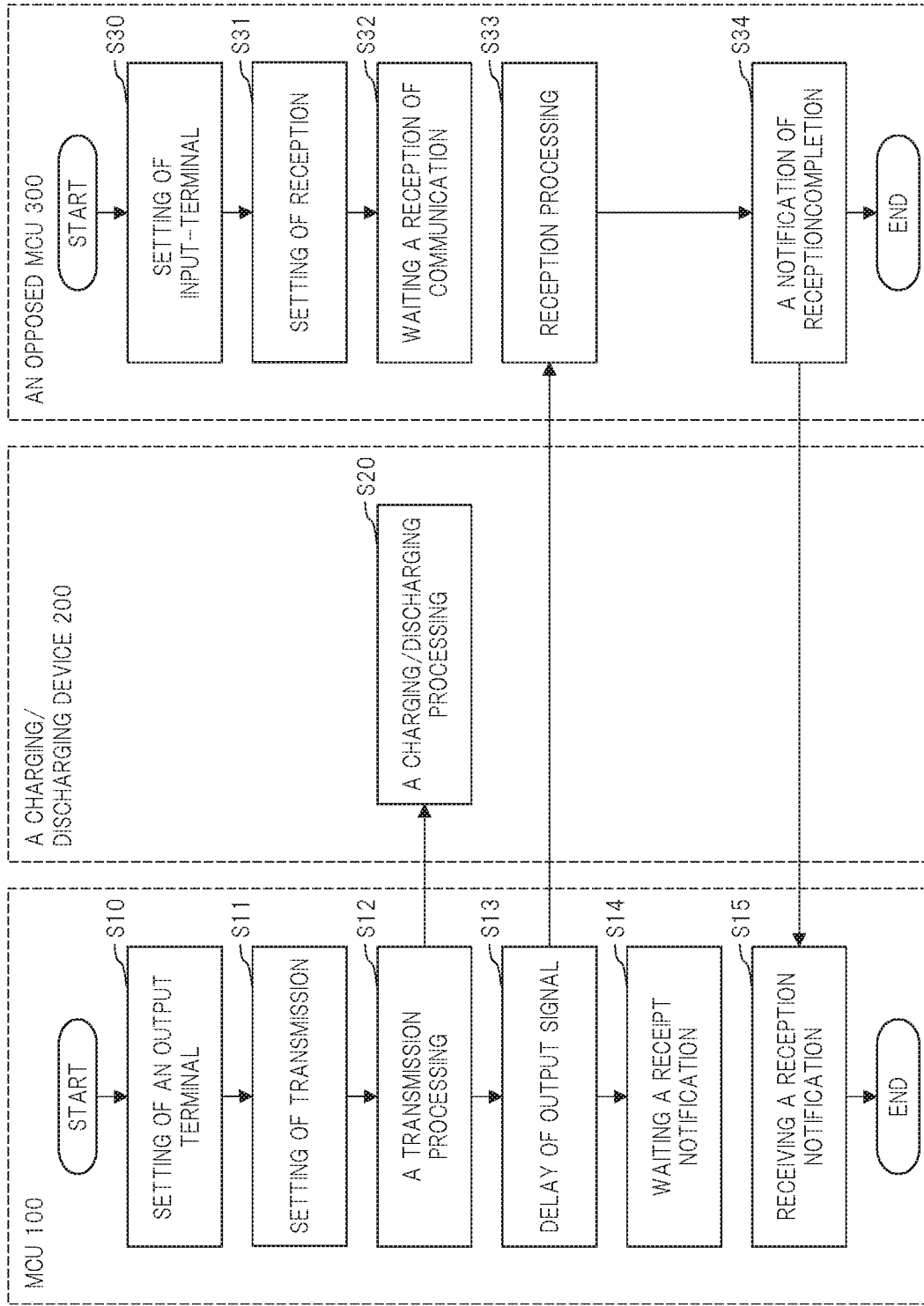
FIG. 2 is a diagram showing an operation flow of the control system 1.

FIG. 2 is a diagram showing an operation flow of the control system 1. In the first embodiment, the IOH and the IOL of the MCU 100 are reduced by charging and discharging by the charging and discharging device 200 during the transmitting process from the MCU 100 to the opposed MCU 300.

In order to communicate with the opposed MCU 300, in step S10, the MCU 100 first sets an output terminal by the terminal control unit 14 of the output terminal. Next, transmission setting is performed by the communication module 12 in order to perform communication (S11), and transmission processing of the set content is performed (S12).

The control unit 20 of the charging/discharging device 200 controls the charging/discharging unit 21 in accordance with the output signal SG2 of the transmission. In step S20, the charging/discharging unit 21 performs a charging/discharging process of discharging when the output signal SG2 is an H output and charging when the output signal SG2 is an L output, thereby reducing the IOH and IOL of the MCU 100.

On the other hand, the output signal SG3 delayed through the output delay device 13 is output to the opposed MCU 300 (S13), and waits until a reception completion notification is received from the opposed MCU 300 (S14).

The opposed MCU 300 performs input-terminal setting for reception processing (S30), performs reception setting for receiving communication (S31), waits until communication is received (S32), and performs reception processing when there is reception from the MCU 100 (S33). When the reception process is completed, a reception completion notification is issued to the MCU 100 in step S34. When the MCU 100 receives the reception completion notification in step S15, the communication process is terminated.

Figure 3:
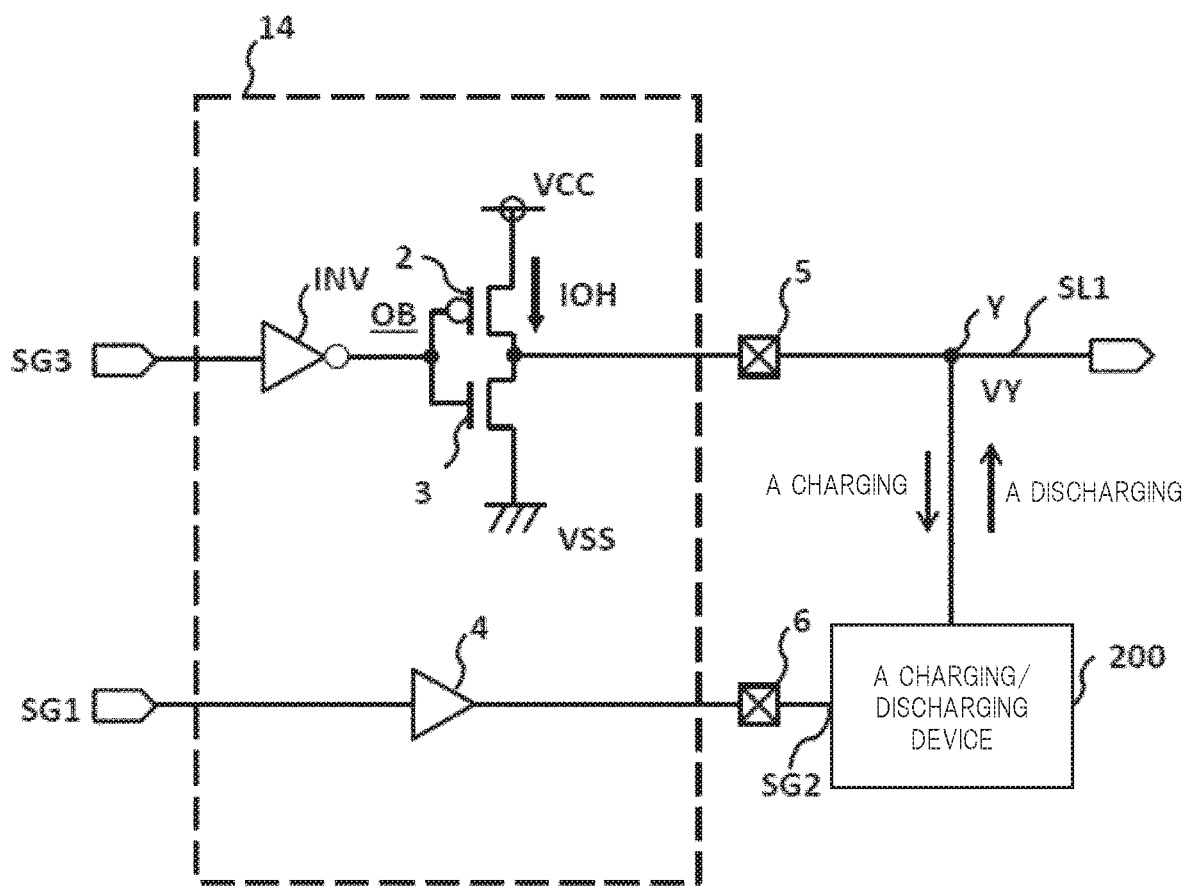
FIG. 3 is a conceptual diagram illustrating the mechanism of IOH reduction.
Figure 13:
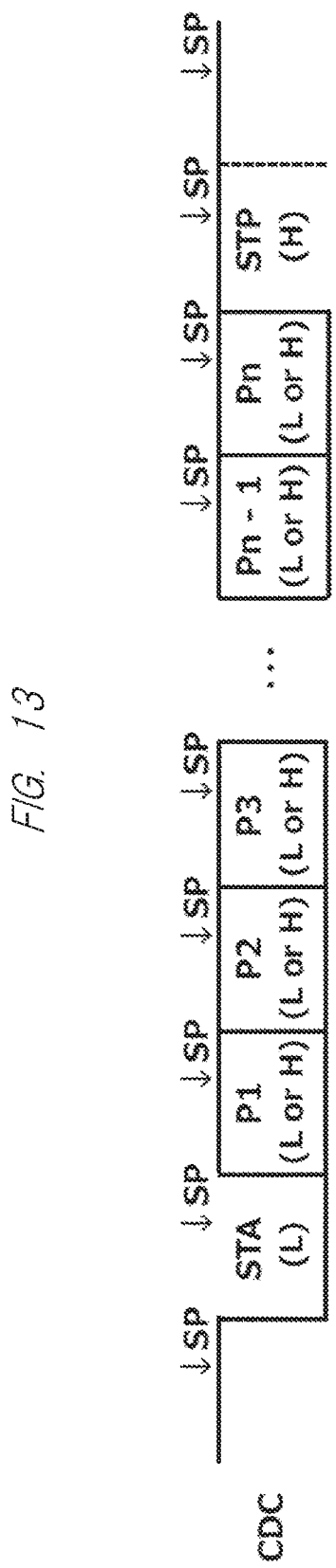
FIG. 13 is a diagram showing a control protocol of a pacing synchronous type according to a fourth embodiment.

FIG. 3 is a conceptual diagram illustrating an IOH reduction mechanism. FIG. 13 exemplarily shows an inverter INV receiving a signal SG3 at its input, an output buffer (first output circuit) OB having its input coupled to the output of the inverter INV, and a buffer circuit 4 (second output circuit) receiving a signal SG1 at its input, which are provided inside the terminal control unit 14. The output buffer OB includes a P-channel MOSFET (hereinafter referred to as PMOS) 2 and an N-channel MOSFET (hereinafter referred to as NMOS) 3. The source-drain path of the PMOS 2 and the source-drain path of the NMOS 3 are connected in series between a power supply voltage VCC, which is a first reference potential, and a grounding voltage VSS, which is a second reference potential lower than the first reference potential. The gate of the PMOS 2 and the gate of the NMOS 3 are commonly connected to the outputs of the inverters INV. A connecting point between the source/drain path of the PMOS 2 and the source/drain path of the NMOS 3 is connected to the first external terminal 5. The PAD 5 is connected to the signal line SL 1, and supplies a communication input signal to the input of the communication modules provided on the opposed MCU 300. The output of the buffer circuit 4 is connected to a second external terminal 6. The PAD 6 is connected to an input of the charging/discharging device 200 via a wire, and supplies a signal SG2 to an input of the charging/discharging device 200.

As shown in FIG. 1, the signal SG 3 is input from the communication module 12 to the terminal control unit 14 via the output delay element 13. When the signal SG3 is at the high level, the PMOS 2 of the output buffer OB is turned on through the inverter INV, whereby IOH flows from the power supply voltage VCC to the PAD 5 of the output buffer OB. At this time, the current amount of IOH increases as the voltage level VY at the PAD 5 and the intersection point Y approaches the grounding voltage VSS, and decreases as the voltage level VY at the PAD 5 and the intersection point Y approaches the power supply voltage VCC.

As shown in FIG. 1, the signal SG1 is input from the communication module 12 to the terminal control unit 14 without passing through the output delay element 13. When the signal SG1 is at a high level, the charging/discharging device 200 performs a discharging operation to make the PAD 5 voltage level VY larger than the grounding voltage VSS.

The mechanism for reducing IOH is described in time series by dividing it into three states: an initial state, a state 1, and a state 2.

In the initial state, the communication output signal (SG3) after timing adjustment is at a low level such as the ground voltage VSS, and the charge/discharge control signal (SG1) is at a low level such as the ground potential VSS. The PMON 2 is in the OFF-state of operation, the charging/discharging device 200 is in the charging operation, and the voltage level VY at the intersection Y is at a low level such as the ground potential VSS. Therefore, the IOH does not flow.

In the state 1, the charge/discharge control signal (SG1) is changed to a high level such as the power supply voltage VCC, the charge/discharge device 200 is changed to a discharge operation, and the voltage level VY at the intersection Y is changed to a VOL level (first predetermined voltage level) lower than the power supply voltage VCC and equal to or higher than the ground potential VSS with respect to the initial state. That is, the voltage level VY at the intersection point Y is charged from the ground potential VSS and reaches the VOL level. The VOL level may be regarded as an intermediate level between the power supply voltage VCC and the ground potential VSS.

In state 2, with respect to state 1, the communication output signal (SG3) after timing adjustment is a high level, such as a power supply voltage VCC, the PMON 2 is in operation ON state, and the voltage level VY at the intersection Y is changed to the power supply voltage VCC. At this time, IOH flows. As for the amount of current IOH, the amount of current flowing when the voltage level VY at the intersection point Y is at the low level such as the ground potential VSS is smaller than the amount of current flowing when the voltage level VY is at the VOL level.

Figure 4:
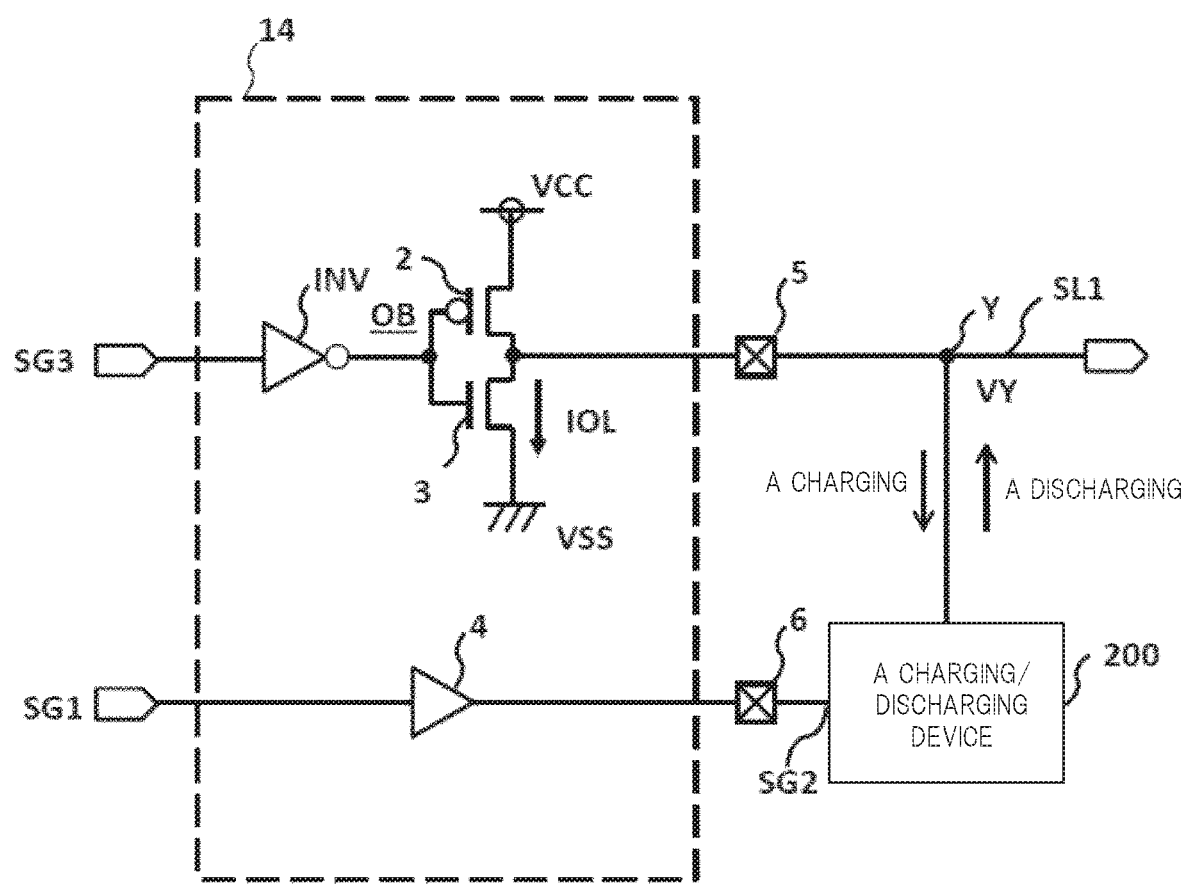
FIG. 4 is a conceptual diagram illustrating the mechanism of IOL reduction.

FIG. 4 is a conceptual diagram illustrating an IOL reduction mechanism. Since the circuit configuration itself shown in FIG. 4 is the same as that shown in FIG. 3, the description thereof is omitted.

When the signal SG3 is at a low level, the NMOS 3 of the output buffer OB is turned on through the inverter INV, so that the signal IOL flows from the PAD 5 to the grounding voltage VSS. At this time, the current amount of the IOL increases as the voltage level VY at the PAD 5 and the intersection Y approaches the power supply voltage VCC, and decreases as the voltage level VY at the PAD 5 and the intersection Y approaches the ground voltage VSS.

When the signal SG1 is at a low level, the charging/discharging device 200 performs a charging operation to make the voltage level VY of the PAD 5 voltage level VY lower than the power supply voltage Vcc.

The mechanism for reducing the IOL will be described in time series by dividing it into three states: an initial state, a state 1, and a state 2.

In the initial state, the communication output signal (SG3) and the charge/discharge control signal (SG1) after the timing adjustment are high-level signals. The NMOS 3 is in the off-state, the charging/discharging device 200 is in the discharge state, and the voltage level VY at the intersection Y is in the high level. Therefore, the IOL does not flow.

In the state 1, the charge/discharge control signal SG1 is a low-level signal with respect to the initial state, the charge/discharge device 200 is in a charging operation, and the voltage level VY at the intersection Y is changed to a VOH level lower than the power supply voltage VCC and equal to or higher than the ground potential VSS. That is, the voltage level VY at the intersection Y is discharged from the power supply voltage VCC and reaches the VOH level. The VOH level can also be regarded as an intermediate level between the power supply voltage VCC and the ground potential VSS.

In the state 2, the timing-adjusted communication output signal SG3 is at a low level such as the ground potential VSS, the timing-adjusted communication output signal NMOS 3 is at an on state, and the voltage level VY at the intersection Y is at the ground potential VSS, and IOL flows at this time. The amount of current flowing at the time of the VOH level becomes smaller than the amount of current flowing at the time of the voltage level VY at the intersection Y being at the high level.

According to the first embodiment, IOH and IOL can be reduced in the MCU 100 consumption current even when the MCU 100 operates at a high speed and the application in which the consumption current and the amount of heat are increased is executed. Therefore, the calorific value of the MCU 100 can be suppressed. In addition, since the amount of heat generated by the MCU 100 can be suppressed, in the mounting substrate on which the MCU 100 is mounted, the thermal countermeasures for the mounting substrate can be relaxed. Furthermore, it is possible to reduce the cost required for thermal countermeasures for the mounting substrate.

The Second Embodiment

Figure 5:
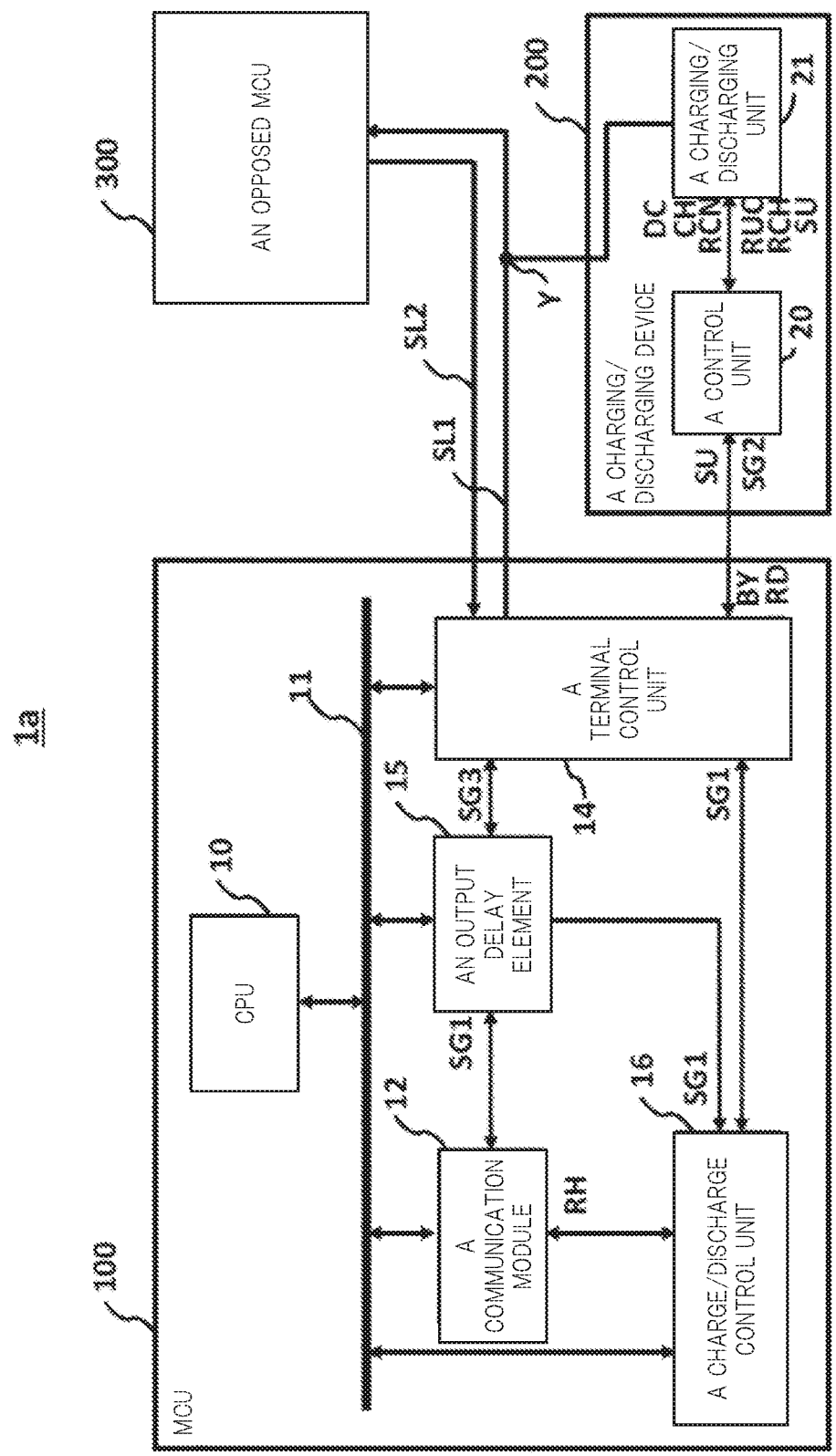
FIG. 5 is a block diagram illustrating a control system according to the second exemplary embodiment.

FIG. 5 is a block diagram showing a control system according to the second embodiment. The entire configuration of the control system 1a, as in the first embodiment, consists of a MCU 100, a charging/discharging device 200, and an opposed MCU 300, and the connections of each (100, 200, 300) are the same as in the first embodiment. Therefore, the description thereof is omitted.

In the first embodiment, it is assumed that the user cannot select whether or not the charging/discharging device 200 is used, and further, the IOH cannot be reduced when the charge amount of the charging/discharging unit 21 is lower than the amount necessary for the discharging process. In order to solve these problems, the second embodiment has a configuration in which a control function is added to the MCU 100 and the charging/discharging device 200.

Embodiments 2 will be described below with reference to the drawings.

MCU 100 includes a CPU 10, a bus 11, a communication module 12, an output-delay control module 15, a charge/discharge control module 16, and a terminal control module 14.)

The CPU 10 is connected to the communication module 12, the output delay control unit 15, the charge/discharge control unit 16, and the terminal control unit 14 via the bus 11, and performs various settings of the communication module 12, the output delay control unit 15, the charge/discharge control unit 16, and the terminal control unit 14.

The communication module 12 inputs/outputs a communication signal from/to the terminal control unit 14 via the output delay control unit 15.

The output delay control unit 15 includes a delay element, and controls whether or not signal delay by the delay element is performed on the output signal SG1 of the communication module 12. In the case of using the charging/discharging device 200, if the communication signal is output before the control of charging or discharging is completed, the IOH or IOL cannot be reduced, and therefore, the timing of the output signal of the communication module 12 is adjusted by the output delay control unit 15. The communication output signal SG1 before the timing adjustment is connected to the charge/discharge control unit 16 as a charge/discharge control signal SG1.

The charge/discharge control unit 16 controls whether or not the charge/discharge device 200 is used, and outputs a use/non-use signal SU of the charge/discharge device 200 to the charge/discharge device 200 via the terminal control unit 14. The charge/discharge control unit 16 monitors whether or not the charging/discharging device 200 is in a standby state (hereinafter referred to as a "ready state"). When the charging/discharging control unit 16 is in a ready state, the charging/discharging control unit 16 outputs a charging/discharging control signal SG1 output from the output delay control unit 15 to the charging/discharging device 200 through the terminal control unit 14. Meanwhile, when the charging/discharging device 200 is in an operational state (hereinafter referred to as a busy state), the communication standby request RH is output to the communication module 12.

As described in the first embodiment, the terminal control unit 14 has a function related to input and output of a terminal.

The charging/discharging device 200 includes a control unit 20 and a charging/discharging unit 21.

The control unit 20 has a function of controlling the charging/discharging unit 21 based on control signals received from the MCU 100. More specifically, the control unit 20 receives the use/non-use signal SU, outputs a connection request RCN to the connection point Y to the charge/discharge unit 21 when the charge/discharge device 200 is used, and outputs a disconnection request RUC for electrically disconnecting the connection point Y to the charge/discharge unit 21 because the voltage level VY of the connection point Y is not affected when the charge/discharge device 200 is not used.

The control unit 20 further outputs a discharge request DC to the charge/discharge unit 21 if the received charge/discharge control signal is an H output, and outputs a charge request CH to the charge/discharge unit 21 if the SG2 is an L output.

In addition, the control unit 20 has a function of monitoring the condition quantity of the charge/discharge unit 21, and when the charge for discharging is insufficient, outputs a charge request RCH to the charge/discharge unit 21, and notifies the MCU 100 that the charge request RCH is busy (hereinafter, referred to as a busy notification BY). On the other hand, when the charge of the charge/discharge unit 21 is sufficient and the control of the charge/discharge of the charge/discharge unit 21 is completed, the control unit 20 notifies the MCU 100 of the ready status (hereinafter referred to as "ready notification RD").

The charging/discharging unit 21 receives the use/non-use signal SU from the control unit 20, connects the charging/discharging unit 21 to the connection point Y when the charging/discharging unit 21 is used, and electrically disconnects the charging/discharging unit 21 from the connection point Y because the voltage level VY of the connection point Y is not affected when the charging/discharging unit 21 is not used. The charging/discharging unit 21 performs a discharging process when a discharging request is received from the control unit 20, and performs a charging process when a charging request is received.

The opposed MCU 300 communicates with the MCU 100. The input signal and the output signal of the opposed MCU 300 are connected to the MCU 100 via the signal line SL 1 and the signal line SL 2.

In the second embodiment, since the processing content of the MCU 100 and the charging/discharging device 200 is more complicated than that of the first embodiment, an example of the communication processing will be described after each operation flow is described.

Figure 6:
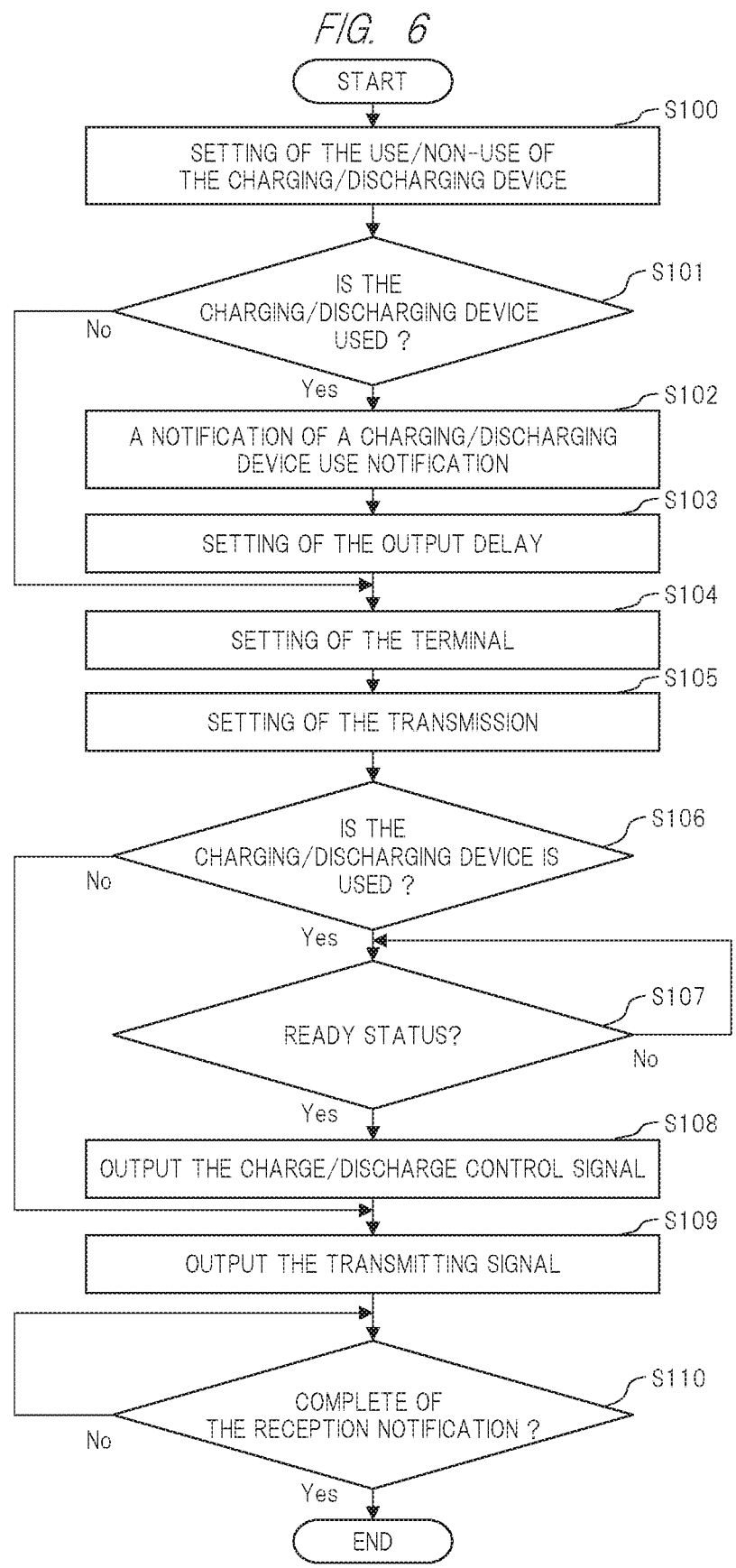
FIG. 6 is a diagram illustrating an operation flow from the initial setting of the MCU 100 to the completion of communication according to the second exemplary embodiment.

FIG. 6 is a flowchart showing an operation flow from initialization to completion of communication of the MCU 100 according to the second embodiment.

The CPU 10 sets the use/non-use of the charging/discharging device 200 to the charging/discharging control unit 16 (S100), and outputs a charging/discharging device use notification to the charging/discharging device 200 (S102) when the charging/discharging device 200 is used (S101). In step S103, the output delay control unit 15 is set so that the output signal of the terminal using the charging/discharging device 200 is delayed. When the charging/discharging device 200 is not used, (S102) and (S103) are not performed.

Next, in association with the communication process, the CPU 10 performs terminal output setting (e.g., output mode setting, output enable setting) on the terminal control unit 14 (S104), and performs transmission setting (e.g., channel setting, communication rate setting, and transmission data setting) on the communication module 12 (S105).

When the charging/discharging device 200 is used (S106), the charging/discharging control unit 16 and the communication module 12 wait until a ready notification RD is received from the charging/discharging device 200 (S107). Upon receiving the ready notification RD, the communication module 12 starts communication processing. Among the output signals, the charge/discharge control signal SG1 before timing adjustment is output as the charge/discharge control signal SG2 to the charge/discharge device 200 via the charge/discharge control unit 16 and the terminal control unit 14 (S108), and the communication signal SG3 after timing adjustment is output to the opposed MCU 300 via the terminal control unit 14 (S109).

The communication module 12 waits until the reception completion notification is received from the opposed MCU 300 (S110), and when the reception completion notification is received, communication is completed.

Figure 7:
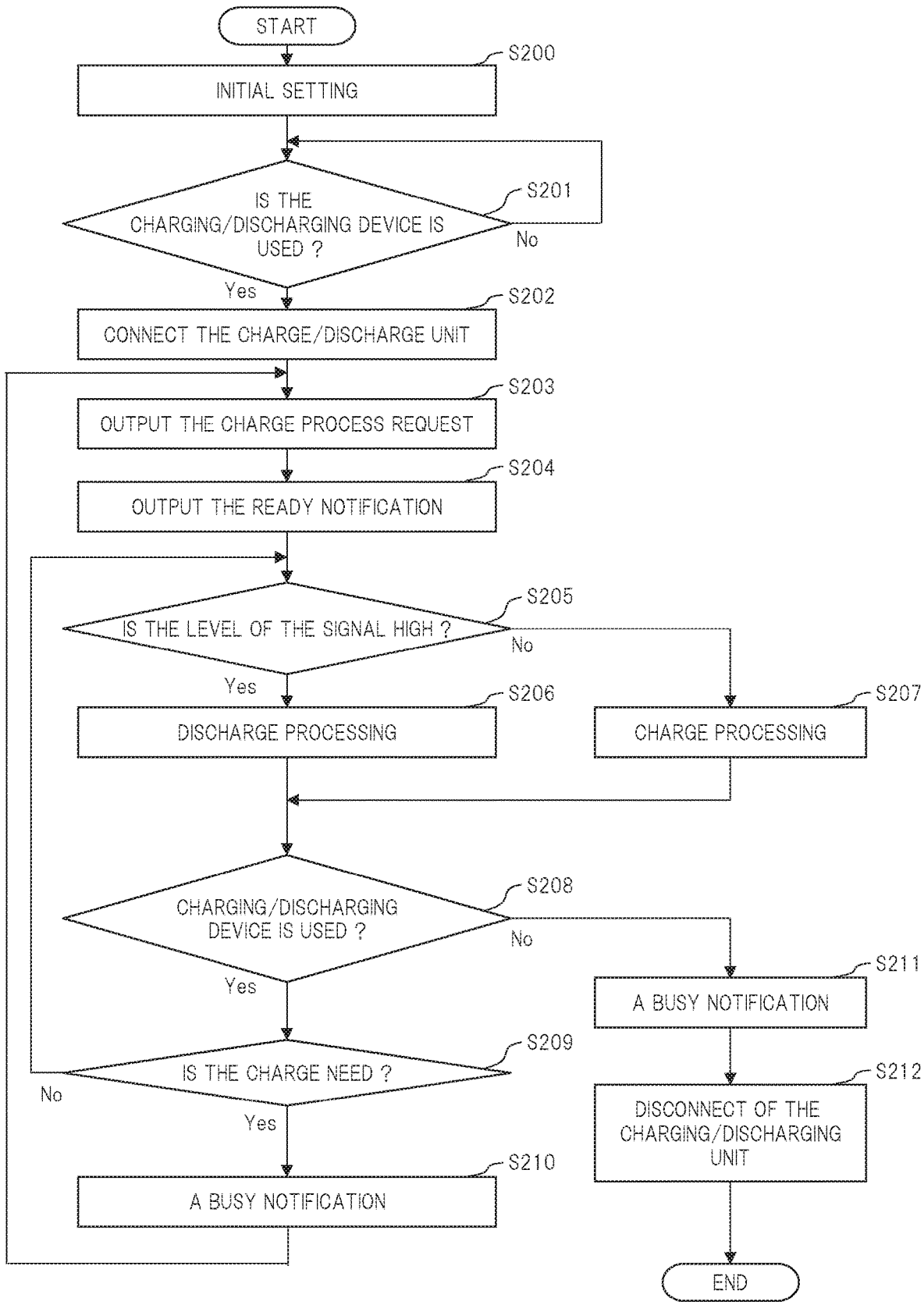
FIG. 7 is a diagram illustrating an operation flow from the initial setting of the charging/discharging device 200 to the completion of the processing according to the second exemplary embodiment.

FIG. 7 is a diagram showing an operation flow from initial setting to completion of processing of the charging/discharging apparatus 200 according to the second embodiment.

The control unit 20 and the charge/discharge unit 21 perform initialization (e.g., disconnection of the charge/discharge unit 21, busy notification BY, etc.) (S200), and wait until a use notification (use/non-use signal SU) of the charge/discharge device 200 is received from the MCU 100 (S201).

When the control unit 20 receives the use notification (use/non-use signal SU) of the charge/discharge device 200, the control unit 20 outputs the charge/discharge unit connection request RCN and the charge process request RCH to the charge/discharge unit 21 (S 202, S 203), and when the charge of the charge unit 21 becomes sufficient, the control unit 20 outputs the ready notification RD to the MCU 100 (S 204).

In accordance with the charge/discharge control signal SG2 from the MCU 100, the control unit 20 outputs the discharge request DC to the charging unit 21 when the charge/discharge control signal SG2 shows H level (S206), and outputs the charge request CH to the charging unit 21 when the charge/discharge control signal SG2 shows L level (S207). The charge/discharge unit 21 performs charge processing or discharge processing in accordance with charge or discharge requirements from the control unit 20, and controls the voltage level VY of the node Y, thereby reducing the IOH or IOL of the MCU 100.

Thereafter, the processes from S205 to S207 are repeated until an unused notification (use/non-use signal SU) of the charging/discharging device 200 is received from the MCU 100 (S208: No), while the charge of the charging/discharging unit is sufficient (S209: No). When the charge of the charging/discharging unit 21 becomes insufficient (S209: YES), the control unit 20 outputs a busy notification BY to the MCU 100 (S 210), returns to the charging process (S203), and thereafter repeats the processes of S203 to S210.

When receiving an unused notification (use/non-use signal SU) of the charging/discharging device 200 from the MCU 100 (S208: NO), the control unit 20 outputs a busy notification BY to the MCU 100 (S211), disconnects the charging/discharging unit 21 (S212), and ends the process.

Figure 8:
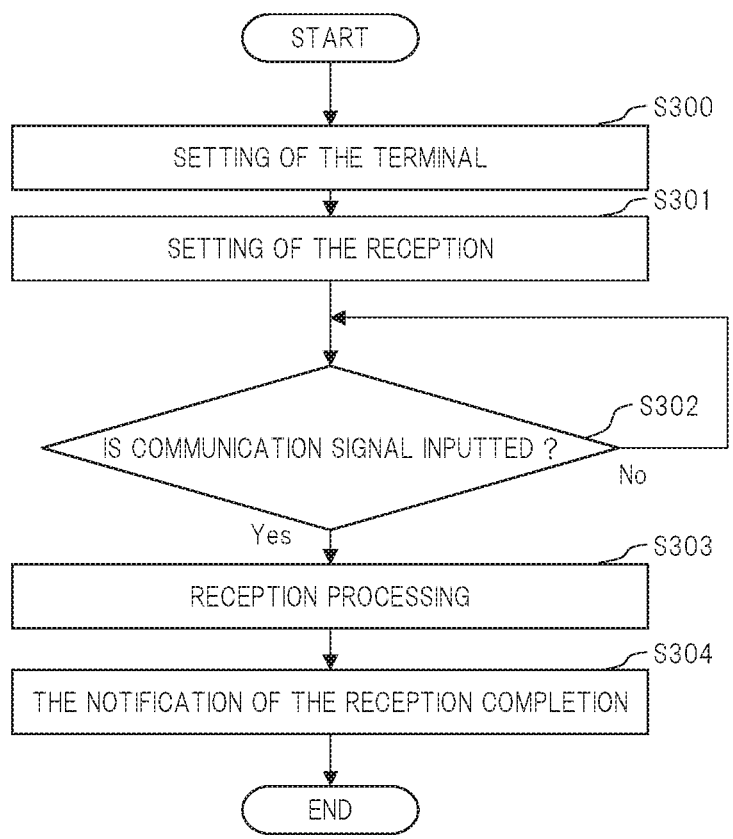
FIG. 8 is a diagram illustrating an operation flow from the initial setting of the opposed MCU 300 to the completion of communication according to the second exemplary embodiment.

FIG. 8 is a diagram showing an operation flow of the opposed MCU 300 from initialization to completion of communication according to the second embodiment.

Contrary to the MCU 100, terminal input setting (e.g., input mode setting, input enable setting) is performed (S300), and reception setting (e.g., channel setting, communication rate setting) is performed (S301).

Thereafter, the process waits until a communication signal is input from the MCU 100 (S302), and when the communication signal is input, a reception process is performed (S303). When the reception processing is completed, a reception completion notification is outputted to the MCU 100 in step S304, and the processing is completed.

Figure 9:
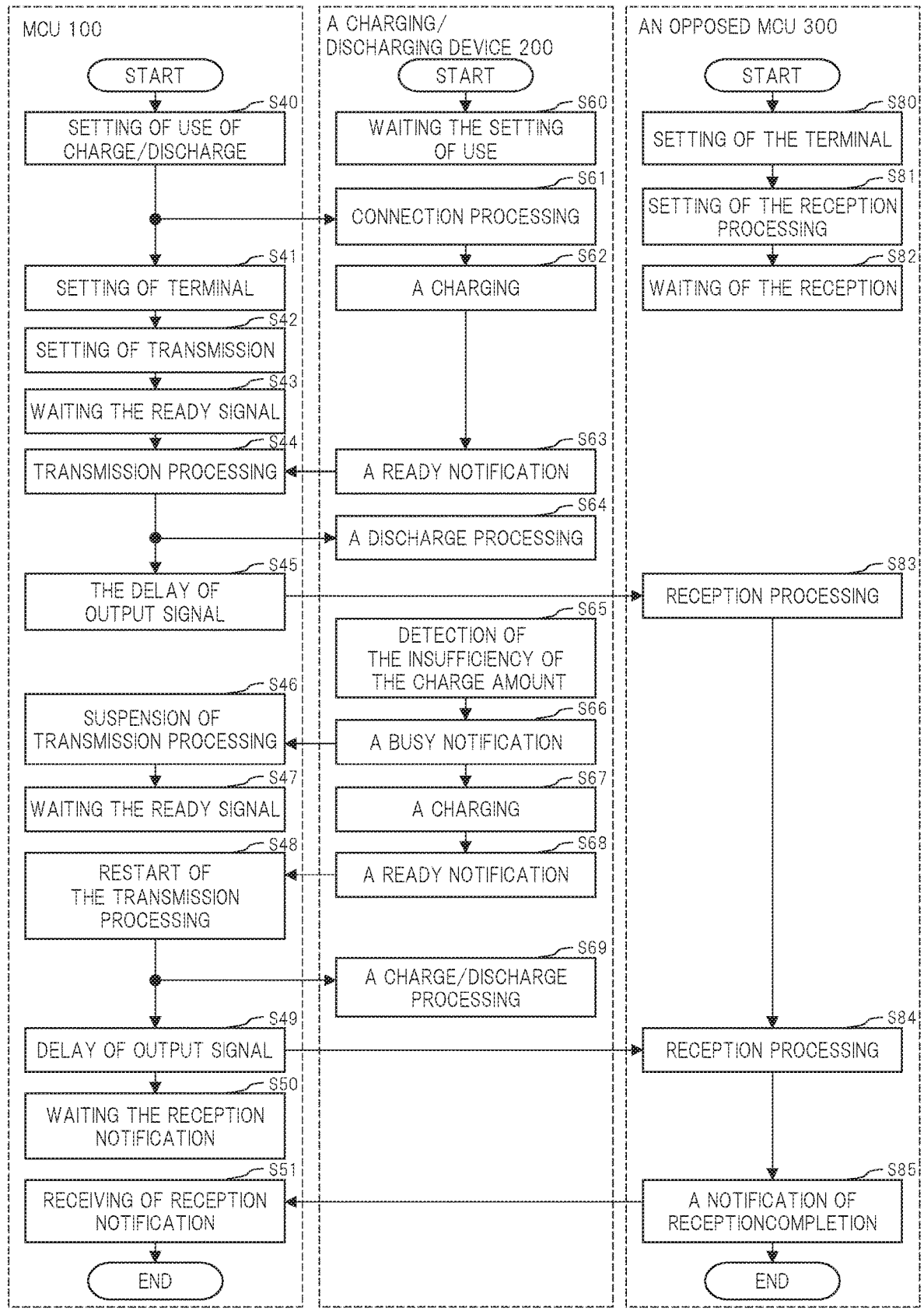
FIG. 9 is a diagram illustrating an operation flow of an example of a communication process and a charging/discharging process according to the second exemplary embodiment.

FIG. 9 is a diagram showing an operation flow of an example of the communication process and the charge/discharge process according to the second embodiment.

The MCU 100 performs charge/discharge use setting in order to use the charge/discharge device 200 (S40), performs terminal output setting in order to transmit the data (S41), performs transmission setting (S42), and waits until the ready notification RD of charge completion.

The opposed MCU 300 sets the inputs of the terminals for reception (S80), performs the reception setting (S81), and waits until the signals are received (S82).

The charging/discharging device 200 waits until the use setting is made from the MCU 100 (S60), and when the use setting is made (S40), after electrically connecting the charging/discharging unit 21 and the MCU 100 outputs signal (S61), performs a charging process (S62), and when the charging is completed, issues a ready notification RD (S63).

In step S44, the MCU 100 receives the ready notification RD, and transmits the ready notification RD.

In the charging/discharging device 200, according to the signal level of the signal SG2, the signal SG2 discharges if the signal SG2 outputted shows H level, and the signal SG2 outputted shows L level (S64). In the opposed MCU 300, the transmitting signal SG3 is received and the receiving process is performed (S83).

When detecting that the amount of charge is insufficient (S65), the charging/discharging device 200 issues a busy signal BY (S66), performs a charging process (S67), and when charging is completed, issues a ready notification RD (S68).

Upon receiving the busy signal BY, the MCU 100 suspends the transmitting process (S46) and waits until the ready signal RD is issued (S47). When the ready notification RD is issued, the transmission process is restarted (S48), and after the transmission process is completed, the process waits until the reception completion notification is issued (S50).

The opposed MCU 300 performs reception processing in accordance with the restarted transmission processing (S84), and when reception is completed, issues a notification of reception completion (S85). When the MCU 100 receives the reception completion notification in step S51, the process ends.

According to the second embodiment, the same effect as that of the first embodiment can be obtained.

In the second embodiment, the user can further select whether or not the charging/discharging device 200 is used. When the charge amount of the charge/discharge unit 21 cannot secure the discharge amount for reducing the IOH, the charge amount of the charge/discharge unit 21 can be secured by performing the charge processing. As a result, IOH can be reduced.

The Third Embodiment

Figure 10:
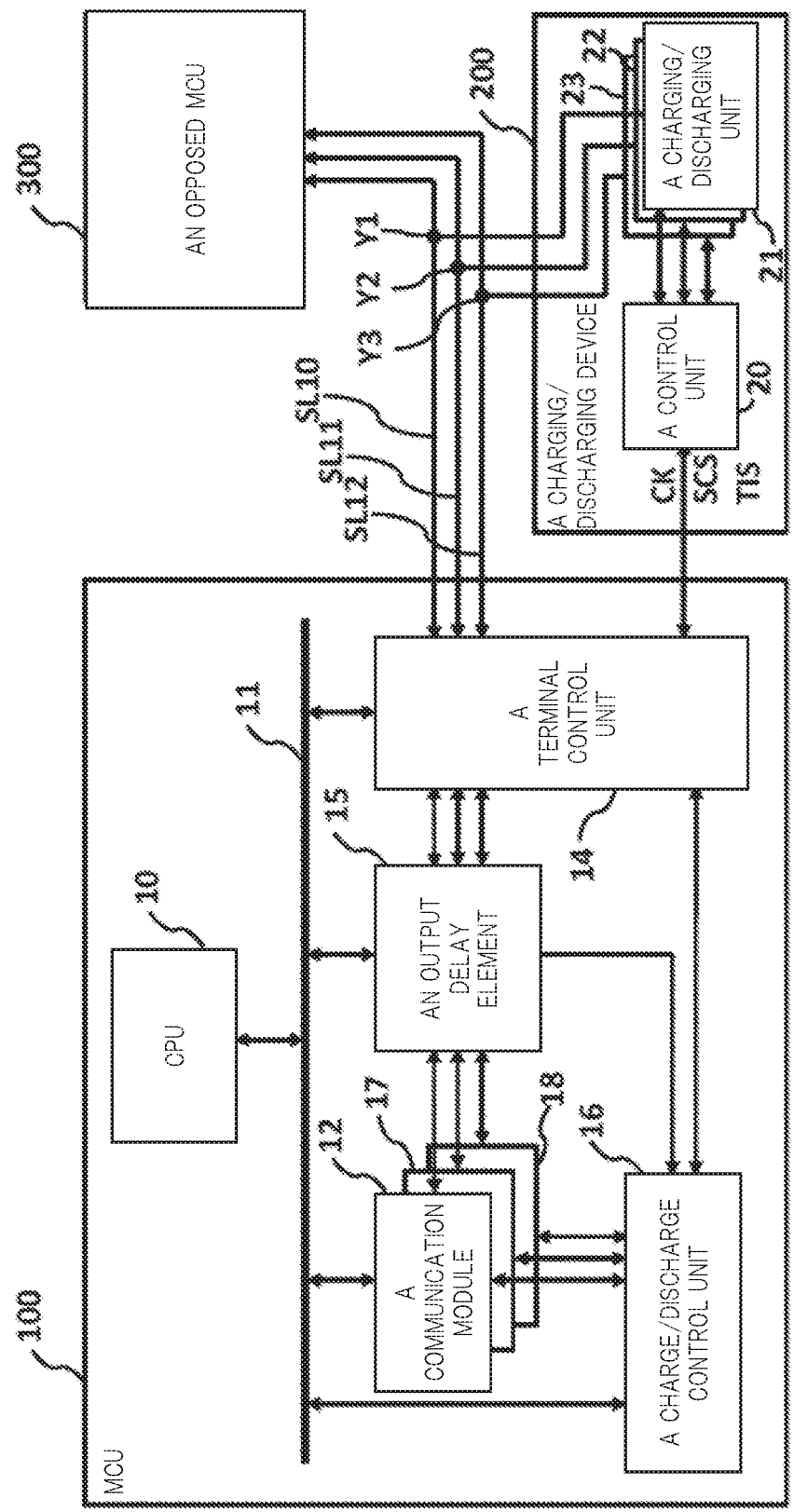
FIG. 10 is a block diagram illustrating a control system according to the third exemplary embodiment.

FIG. 10 is a block diagram showing a control system according to a third embodiment. In the control system 1b, the MCU 100 and the opposed MCU 300 communicate with each other using a plurality of communication modules 12, 17, and 18. The charging/discharging device 200 is connected to signals outputted from a plurality of communication modules 12, 17, and 18 directed from the MCU 100 to the opposed MCU 300. The other configuration is the same as that of the second embodiment. In FIG. 10, portions different from those of the second embodiment are mainly shown in order to simplify and facilitate understanding of the drawings.

MCU 100 further includes a communication module 17 and a communication module 18 in addition to the communication module 12. Similar to the communication module 12 shown in the second embodiment, the communication modules 17 and 18 are connected to the CPU 10 and the charge/discharge control unit 16. The communication modules 17 and 18 are also connected to the terminal control unit 14 via the output delay control unit 15.

Since the opposed MCU 300 communicates with the MCU 100 three communication modules 12, 17, and 18, the opposed MCU 300 and the MCU 100 are connected via a plurality of signal lines SL 10, signal lines SL 11, and signal lines SL 12.

In correspondence with the three communication modules 12, 17, and 18, the charging/discharging device 200 is provided with three charging/discharging units 21, 22, and 23. The output signal of the communication module 12 is output to the signal line SL 10 via the terminal control module 14. Similarly, an output signal of the communication module 17 is output to the signal line SL 11 via the terminal control module 14. The output signal of the communication module 18 is output to the signal line SL 12 via the terminal control module 14.

The charge/discharge units 21, 22, and 23 are connected to the plurality of signal wirings SL 10, the signal wirings SL 11, and the signal wirings SL 12 for connecting the MCU 100 and the opposed MCU 300, respectively, at connection points Y 1, Y 2, and Y 3, and control the potential levels of the connection points Y 1, Y 2, and Y 3 in the same manner as in the first embodiment and the second embodiment.

Since the number of terminals of the control signal from the MCU 100 (charge/discharge control unit 16) to the control unit 20 increases when the control signal is controlled by the number of signals of all the output signals, the charge/discharge device is controlled by a small number of control signals. That is, in the third embodiment, the charge/discharge control unit 16 includes a communication circuit (transmitting circuit) that performs transmission using a clock synchronous control protocol. The control unit 20 includes a communication circuit (receiving circuit) that performs reception using a clock synchronous control protocol. The communication circuit (transmitting circuit) of the charge/discharge control unit 16 transmits a control signal from the MCU 100 to the control unit 20, and the control unit 20 receives the control signal transmitted from the charge/discharge control unit 16 by the communication circuit (receiving circuit). The signals used in the clock synchronous control protocols are three signals, i.e., the synchronous clock CK, the setting control signal SCS, and the terminal information signal TIS, and the communication between the MCU 100 and the control unit 20 is controlled by these three signals.

Figure 11:
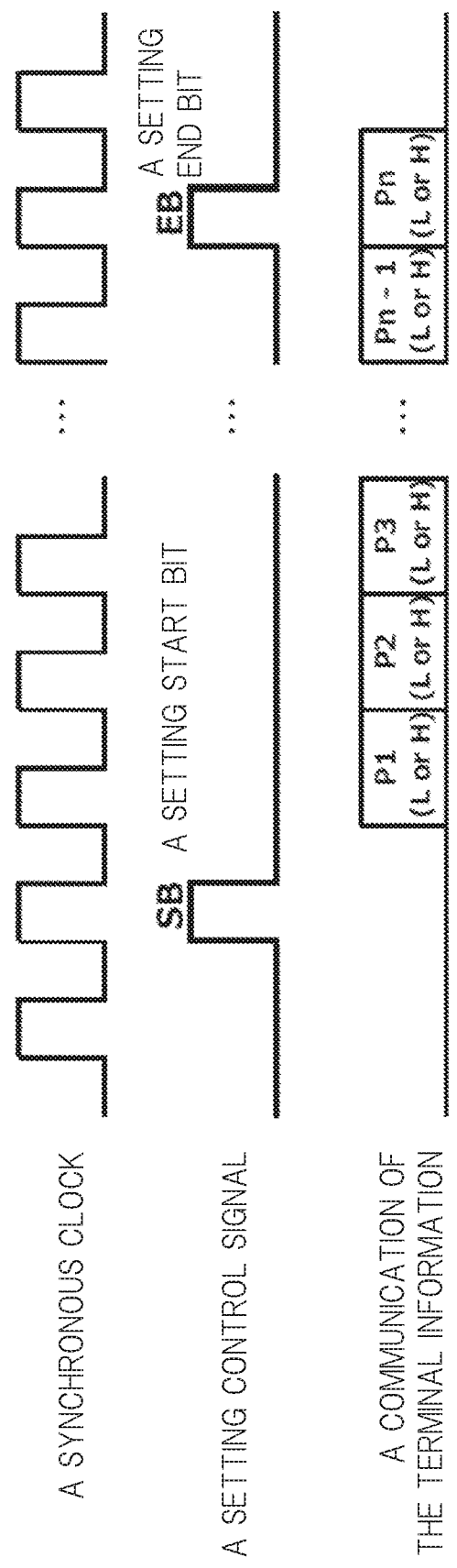
FIG. 11 is a diagram illustrating a clock synchronization control protocol according to a third embodiment.

FIG. 11 is a diagram showing a clock synchronous control protocol.

The setting control signal SCS and the terminal information signal TIS operate in synchronization with the synchronous clock CK.

The setting control signal SCS has a setting start bit SB indicating the start of setting and a setting end bit EB indicating the end of setting. In the setting control signal SCS, the setting start bit SB and the setting end bit EB are at a high level (H output), and in other states, the setting control signal SCS is at a low level (L output). When the number of output signals to be set is n, i.e., the number of terminals is n, and the terminals P1 to Pn, the setting end bit EB is controlled to output H after n clocks.

The terminal control signal TIS sequentially outputs charge/discharge information of n output signals from the clock next to the set start bit SB in one clock cycle. The charge/discharge information is composed of control information (L or H) indicating whether the terminal corresponding to each of the terminals P(P1 to Pn) is set to a low level (L) or a high level (H). The cycle of the synchronous clock CK needs to secure a sufficient time for the charging and discharging units 21, 22, and 23 to perform charging and discharging.

According to the third embodiment, by using the charge/discharge control methods described with reference to FIG. 11, it is unnecessary to connect the control signals corresponding to the number of all the communication output terminals of the MCU 100 to the charge/discharge device 200, and the charge/discharge control of the number of all the communication output terminals of the MCU 100 can be performed by three control signals.

Figure 12:
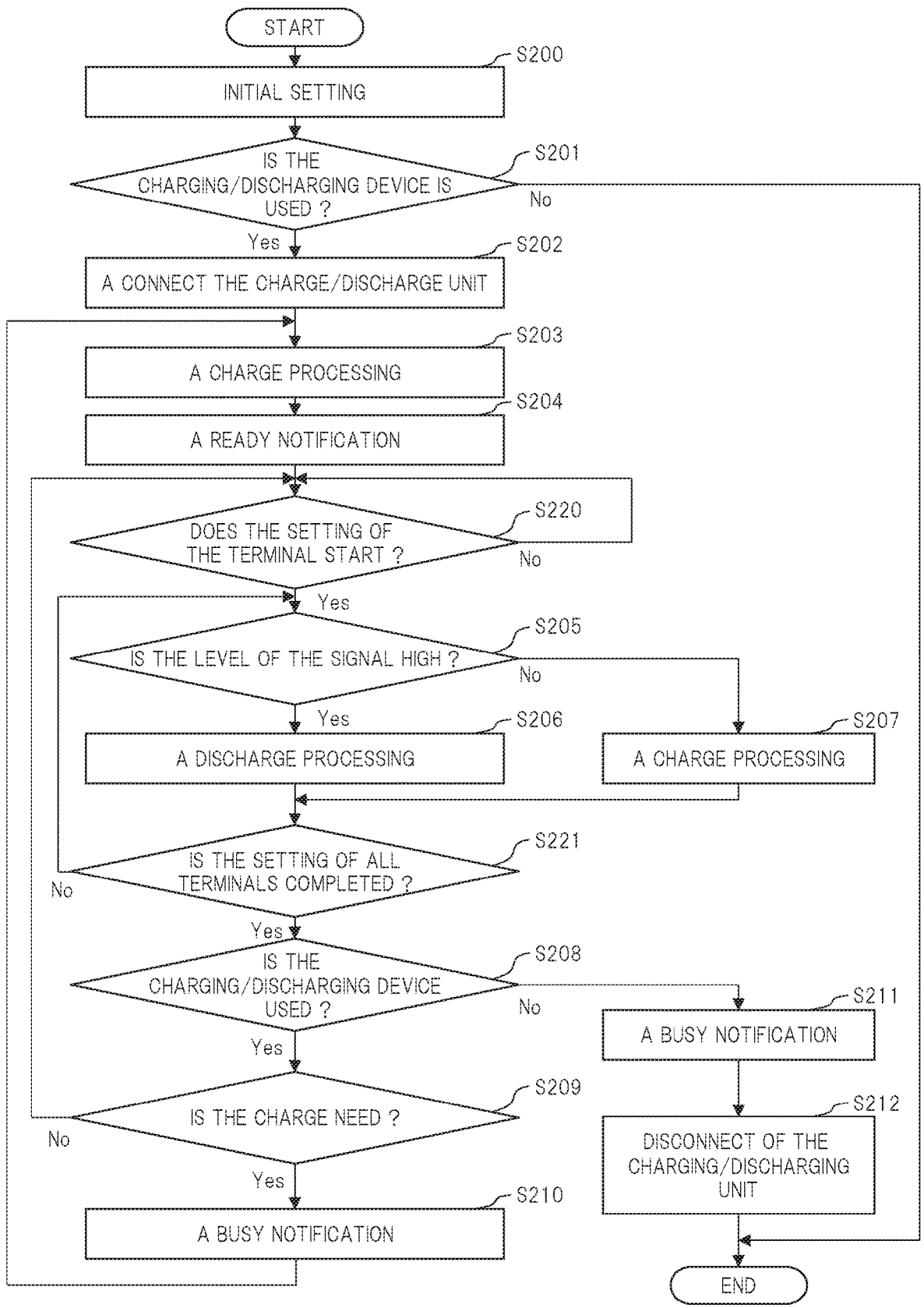
FIG. 12 is a diagram illustrating an operation flow from the initial setting of the charging/discharging device 200 to the completion of the processing according to the third exemplary embodiment.

FIG. 12 is a diagram showing an operation flow from initial setting to completion of processing of the charging/discharging apparatus 200 according to the third embodiment.

In the operation flow of the MCU 100 according to the third embodiment, the terminal setting and the transmission/reception setting are changed from one communication module to three communication modules, and even when the MCU 100 charge/discharge control signals are changed to be outputted by the clock-synchronous control protocols of FIG. 11, the operation flow does not change, so that the explanation of FIG. 6 can be referred to.

The operation flow of the opposed MCU 300 according to the third embodiment does not change even when the operation flow is changed from one communication module to three communication modules by the terminal setting and the transmission/reception setting, so that the explanation of FIG. 8 can be referred to.

The operation flow of the charging/discharging device 200 of the third embodiment is the same as the description of FIG. 7 of the second embodiment until the charging/discharging control (S205 to S207), and after the ready notification RD, waits until the setting start bit SB is received (S220), and receives the setting start bit SB, performs the processing of S205 to S207. When the setting of all the terminals has not been completed (S221: No), the processing of S205 to S207 is repeated until the setting of all the terminals is completed. The processing from S208 to S212 performed after the setting of all the terminals is completed (S221: Yes) is the same as the description of FIG. 7 of the second embodiment.

By controlling charge and discharge of IOH or IOL relating to a plurality of output signals (signal wirings SL 10 and SL 11 and SL 12) with three control signals (CK, SCS and TIC), IOH or IOL can be efficiently reduced. As a result, the power consumed by the MCU 100 can be reduced, and the amount of heat generated by the MCU 100 can be suppressed.

The Fourth Embodiment

In the charge/discharge control method shown in the third embodiment, the charge/discharge control unit 16 has a configuration using a control protocol of a clock synchronization method. The fourth embodiment has a configuration in which a control protocol of the start-stop synchronization type is employed as a control protocol employed in the charge/discharge control unit 16. The configuration of the control system in the fourth embodiment is the same as the configuration of the control system in the third embodiment except for the configuration of the charge/discharge control unit 16 and the control circuit 20 using the control protocol of the pacing synchronous type, and therefore the description of the configuration in the fourth embodiment is omitted.

FIG. 13 is a diagram showing a control protocol of the pacing synchronization type according to the fourth embodiment.

The control unit 20 of the charging/discharging device 200 samples the signal level of the charging/discharging control signal CDC transmitted from the charging/discharging control unit 16 at sampling points SP at regular intervals. The charge/discharge control signal CDC transmitted from the charge/discharge control unit 16 is normally an output of a high level (H), and outputs a low level (L) at the setting start bit STA, sequentially outputs n pieces of charge/discharge control information (charge/discharge information (L or H) of P1 to Pn) from the next SP, and outputs a high level (H) of the setting completion bit STP at the next SP of the n-th charge/discharge information (charge/discharge information of Pn).

According to the fourth embodiment, charging and discharging can be controlled by one control signal CDC with respect to the three control signals CK, SCS, and TIS in the third embodiment, and IOH or IOL of a plurality of terminals can be reduced more efficiently.

The Fifth Embodiment

Figure 14:
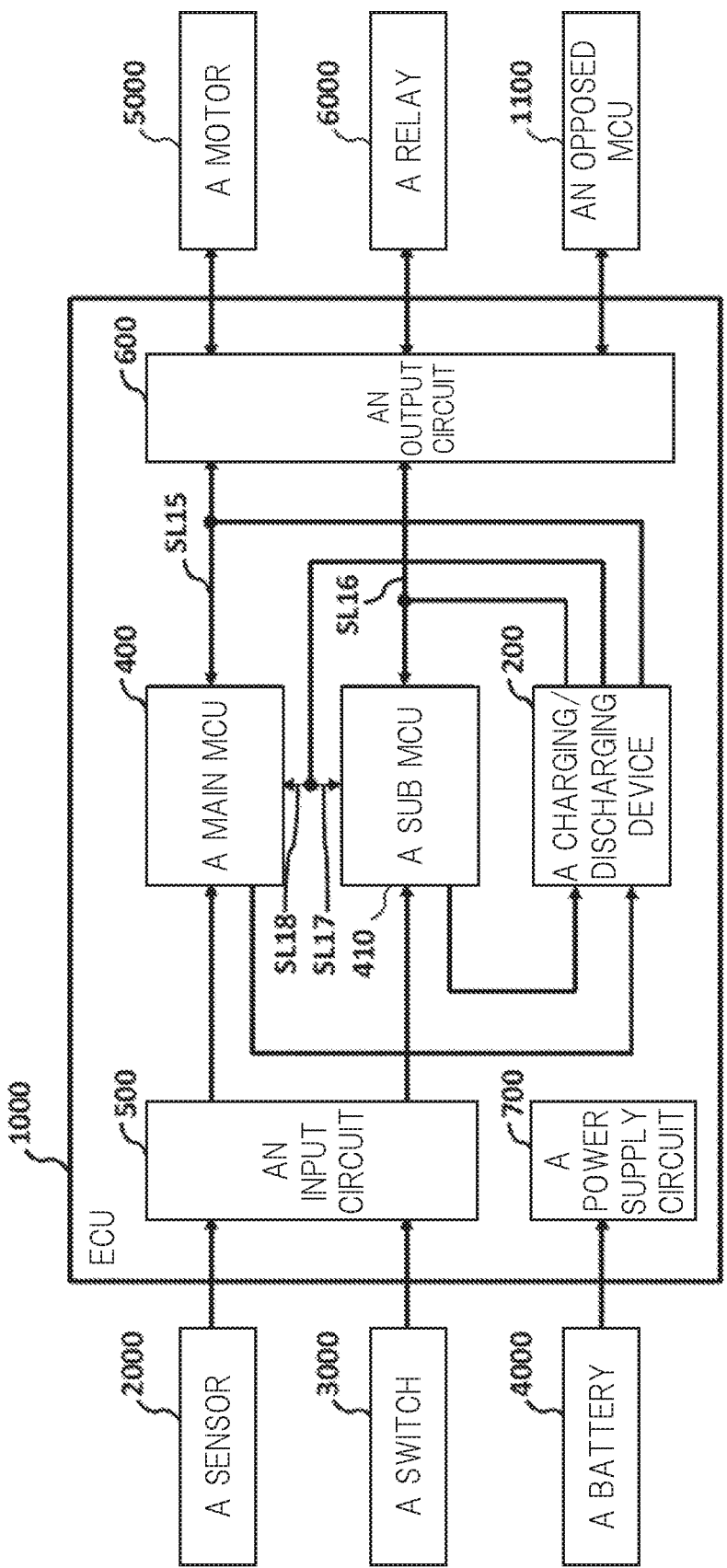
FIG. 14 is a diagram illustrating a configuration example of an automobile engine control system according to the fifth exemplary embodiment.

FIG. 14 is a diagram showing a configuration example of an engine control system of an automobile according to the fifth embodiment.

An engine control system SYS for controlling an engine of a vehicle includes an electronic control unit (ECU) 1000 as an engine control unit, sensors 2000, switches 3000, a battery 4000, a motor 5000, relays 6000, and a opposed ECU 1100. The electronic control unit (ECU) 1000 includes a plurality of MCUs (main MCU 400 and sub MCU 410), a charging/discharging device 200, an input circuit 500, a power supply circuit 700, and an output circuit 600. Each of the main MCU 400 and the sub MCU 410 has the MCU 100 configuration shown in FIG. 1, FIG. 5, or FIG. 10. The charging/discharging device 200 reduces the IOH and IOL of the main MCU 400 and the sub MCU 410 in the ECU 1000.

The ECU 1000 is supplied with power from the battery 4000 through the power supply circuit 700, and inputs an input signal from the sensors 2000 and an input signal from the switches 3000 to the main MCU 400 and the sub MCU 410 through the input circuit 500. On the other hand, the motors 5000, the relays 6000, and the opposed ECU 1100, which are controlled by the ECU 1000, exchange signals with the main MCU 400 and the sub MCU 410 via the output circuits 600.

The charging/discharging device 200 receives control signals from the main MCU 400 and the sub MCU 410, and controls the voltage levels of the output signals of the main MCU 400 and the sub MCU 410. Accordingly, the charging/discharging device 200 includes a first input circuit or a first receiving circuit that receives a control signal from the main MCU 400, and a second input circuit or a second receiving circuit that receives a control signal from the sub MCU 410. The first input circuit or the first receiving circuit and the second input circuit or the second receiving circuit can perform an input operation or a reception operation in parallel. As the control signals outputted from the main MCU 400 or the sub MCU 410, for example, SG 2 of FIG. 1, SU and SG 2 of FIG. 5, CK, SCS and TIS of FIG. 10 or 11, CDC of FIG. 13, or the like can be used.

The charging/discharging device 200 is connected to one or more signal lines SL 15 connected from the main MCU 400 to the output circuit 600, and to one or more signal lines SL 16 connected from the sub MCU 400 to the output circuit 600. The charging/discharging device 200 is also connected to one or more signal lines SL 17 of a signal output from the main MCU 400 to the sub MCU and one or more signal lines SL 18 of a signal output from the sub MCU 400 to the main MCU. The charging/discharging device 200 controls the voltage levels of the signal lines SL 15-SL 18 in the same manner as described in Embodiments 1 to 4. The operation of reducing IOH and IOL in the main MCU 400 and the charging/discharging device 200, and the sub MCU 410 and the charging/discharging device 200 is the same as that of the first embodiment, the second embodiment, the third embodiment, or the fourth embodiment, and therefore, the explanation thereof is omitted.

The invention made by the present inventor has been specifically described above based on the examples, but the present invention is not limited to the above-described embodiments and examples, and it is needless to say that the present invention can be variously modified.

What is claimed is:

1. A control system comprising
a terminal controller for being input a first signal, and
a charge/discharge control transmission circuit being coupled with the terminal controller via a first cross point and being input a second signal,
wherein the first signal is made by delaying of the second signal, and
wherein the charge/discharge control transmission circuit controls a voltage of the first cross point based on the second signal when a signal level of the first signal differs from a signal level of the second signal, and
wherein the charge/discharge control transmission circuit moves the voltage of the first cross point close to a source voltage, when the signal level of the first signal is low level and the signal level of the second signal is high level.

2. A control system, comprising:
a first semiconductor device;
a second semiconductor device;
a signal wiring provided between the first semiconductor device and the second semiconductor device; and
a charging and discharging device connected to the signal wiring,
wherein the first semiconductor device includes:
a communication circuit for outputting a signal;
a delay circuit;
an output circuit having an input and an output;
a first external terminal connected to the output of the output circuit and connected to the signal wiring; and
a second external terminal,
wherein the input of the output circuit receives the signal delayed by the delay circuit,
wherein the second external terminal receives the signal without passing through the delay circuit, and
wherein the charging and discharging device receives the signal from the second external terminal to control a voltage level of the signal wiring,
wherein the first semiconductor device includes:
an output delay control unit including the delay circuit; and
a charge/discharge control transmission circuit connected to the output delay control unit,
wherein the charge/discharge control transmission circuit controls whether or not the signal output from the communication circuit is delayed using the delay circuit,
wherein the charge/discharge control transmission circuit outputs a control signal for changing the voltage level of the signal wiring by the charging and discharging device to a predetermined voltage level between a first reference potential and a second reference potential lower than the first reference potential when the signal output from the communication circuit is delayed using the delay circuit, and
wherein the charge/discharge control transmission circuit does not output the control signal for changing the voltage level of the signal wiring by the charging and discharging device to the predetermined voltage level between the first reference potential and the second reference potential when the signal output from the communication circuit is not delayed using the delay circuit.

3. The control system according to claim 2, wherein the charging and discharging device changes the voltage level of the signal wiring to the predetermined voltage level between the first reference potential and the second reference potential before the output circuit changes the voltage level of the signal wiring to the first reference potential or the second reference potential lower than the first reference potential based on the delayed signal.

4. The control system according to claim 2,
wherein the charging and discharging device includes:
a control circuit; and
a charging/discharging unit, and wherein the control circuit detects a shortage of the charge amount of the charging/discharging unit and charges the charging/discharging unit.

5. A control system comprising:
a first semiconductor device;
a second semiconductor device;
a plurality of signal wirings provided between the first semiconductor device and the second semiconductor device; and
a charge/discharge device connected to the plurality of signal wirings for controlling voltage levels of the plurality of signal wirings,
wherein the first semiconductor device includes:
   a plurality of communication circuits;
   an output delay control unit including a delay circuit;
   a charge/discharge control transmission circuit connected to the output delay control unit; and
   a plurality of output circuits to which signals from the plurality of communication circuits are input via the output delay control unit and connected to the plurality of signal wirings,
wherein the charge/discharge control transmission circuit transmits terminal information to the charge/discharge device,
wherein the charge/discharge device controls voltage levels of the plurality of signal wirings based on the terminal information,
wherein the charge/discharge control transmission circuit controls whether or not the signals output from the plurality of communication circuits are delayed by using the delay circuit and supplied to the plurality of output circuits, and
wherein when the signal output from the plurality of communication circuits is delayed using the delay circuit, the charge/discharge control transmission circuit changes the voltage level of the plurality of signal wirings to a predetermined voltage level between a first reference potential and a second reference potential by the charge/discharge device before the plurality of output circuits change the voltage level of the plurality of signal wirings to the first reference potential or the second reference potential lower than the first reference potential based on the delayed signal.

6. The control system according to claim 5, wherein the charge/discharge control transmission circuit transmits the terminal information to the charge/discharge device using a clock synchronous protocol.

7. The control system according to claim 5, wherein the charge/discharge control transmission circuit transmits the terminal information to the charge/discharge device using a paced synchronous protocol.

8. The control system according to claim 5,
wherein the charge/discharge device includes a control circuit and a charging/discharging unit, and
wherein the control circuit detects a shortage of the charge amount of the charging/discharging unit and charges the charging/discharging unit.

\* \* \* \* \*